(12) United States Patent
Strittmatter (10) Patent No.: US 9,014,693 B2
(45) Date of Patent: Apr. 21, 2015

(54) MONITORING ROAMING CALLS (76) Inventor: Christian Strittmatter, Mettmann (DE)

( * ) Notice: Subject to any disclaimer, the term of this patent is extended or adjusted under 35 U.S.C. 154(b) by 896 days.

(21) Appl. No.: 12/596,769

(22) PCT Filed: Apr. 21, 2008

(86) PCT No.: PCT/EP2008/003181
§ 371 (c)(1),
(2), (4) Date: Nov. 6, 2009

(87) PCT Pub. No.: WO2008/128742
PCT Pub. Date: Oct. 30, 2008

(65) Prior Publication Data
US 2010/0056139 A1    Mar. 4, 2010

(30) Foreign Application Priority Data
Apr. 20, 2007  (EP) .................................. 07008062

(51) Int. Cl.
*H04W 4/00*     (2009.01)
*H04W 12/12*    (2009.01)

(52) U.S. Cl.
CPC ...................................... *H04W 12/12* (2013.01)

(58) Field of Classification Search
USPC ........................................ 455/432, 432.1, 433
See application file for complete search history.

(56) References Cited

U.S. PATENT DOCUMENTS

| | | | |
|---|---|---|---|
| 5,978,669 A * | 11/1999 | Sanmugam | 455/410 |
| 6,453,028 B1 * | 9/2002 | Ganesh | 379/112.04 |
| 7,310,511 B2 * | 12/2007 | Barnea et al. | 455/408 |
| 2004/0142689 A1 * | 7/2004 | Boda | 455/432.1 |
| 2007/0072587 A1 * | 3/2007 | Della-Torre | 455/410 |
| 2007/0213075 A1 * | 9/2007 | Jiang | 455/461 |

FOREIGN PATENT DOCUMENTS

| | | |
|---|---|---|
| EP | 0788287 A2 | 8/1997 |
| EP | 1134995 A | 7/2000 |
| EP | 1372298 A | 12/2003 |
| EP | 1771031 A | 4/2007 |
| WO | 9916272 | 4/1999 |
| WO | 0069201 | 11/2000 |
| WO | 2005076653 A1 | 8/2005 |

OTHER PUBLICATIONS

European Search Report from EP07008062.7, dates Apr. 10, 2007.

* cited by examiner

*Primary Examiner* — Kent Chang
*Assistant Examiner* — Scott Au
(74) *Attorney, Agent, or Firm* — McDonnell Boehnen Hulbert & Berghoff LLP (57) ABSTRACT

To monitor roaming calls, at first locations (1), first information (31) defining features of the roaming calls is received from second locations (2) for reporting the roaming calls to the first locations (1). In response to the first information (31), second information (32,33) defining the roaming calls being allowed and comprising requests for data is transmitted to the second locations (2), and third information (34,35) comprising responses with the data is received from the second locations (2) for evaluating the roaming calls, to perform on-the-fly roaming fraud detection and avoid clearing house constructions. The roaming calls may be billed via post-paid subscriptions. The data is arranged to create timing data defining timing features of billing periods of roaming calls. At the first locations (1), the third information (34,35) may be converted into reports (41,42) for said evaluating, and in response to evaluations, fourth information (36) may be transmitted to the second locations (2).

12 Claims, 6 Drawing Sheets

MONITORING ROAMING CALLS

CROSS REFERENCE TO RELATED APPLICATIONS

The present application is a national stage entry of PCT/EP/003181, filed on Apr. 21, 2008, and claims priority to European Patent Application EP 07008062.7, filed in the European Patent Office on Apr. 20, 2007, the entire contents of both of which are incorporated herein by reference.

The invention relates to a method for monitoring a roaming call, and also relates to a computer program product, to a medium, and to an arrangement for monitoring a roaming call.

A prior art method is known from EP 1 209 935 B1, which discusses fraud detection methods for mobile telecommunication networks in general. More in particular, in its paragraph 0015, roaming fraud is discussed. International roaming is possible for most of the mobile systems wherein the fraud is carried out by initiating call selling operations by using foreigner subscriptions in certain countries where roaming is possible. This fraudulent activity can hardly be detected on time to act because of late reporting and billing from the operators involved. These and many other fraud risks have been identified and justify the efforts to provide the means to prevent fraud, and also to detect the specific fraudulent activity.

It is an object of the invention, inter alia, to provide a method for monitoring a roaming call to detect roaming fraud in a relatively efficient way.

Further objects of the invention are, inter alia, to provide a computer program product, a medium, and an arrangement for monitoring a roaming call to detect roaming fraud in a relatively efficient way.

According to a first aspect of the invention, a method as defined in claim 1 is provided. According to a first step, at a first location, first information is received from a second location for reporting the roaming call to the first location. The first location is for example a home network or a home switch or a home location register. The second location is for example a visited network or a visited mobile switching center or a visited location register. According to a second step, at the first location, in response to a reception of the first information, second information is transmitted to the second location. According to a third step, at the first location, third information is received from the second location for evaluating the roaming call.

The first step and a part of the second step allow the first location to be informed by the second location about the roaming call that for example is to be set up at the second location for a subscriber who is to be billed at the first location for this roaming call based on data for example provided by the second location. A further part of the second step and the third step allow the first location to communicate with the second location about this roaming call. As a result, a relatively efficient on-the-fly roaming fraud detection procedure has been created which may be used in parallel to existing constructions which may be held responsible for late reporting.

An embodiment of the method is defined in claim 2. Nowadays, roaming fraud is a main issue for post-paid subscriptions, pre-paid subscriptions do not suffer that much from roaming fraud. Preferably, the first information defines one or more features of the roaming call, such as a calling party number and/or a calling party address, and the second information defines the roaming call being allowed.

An embodiment of the method is defined in claim 3. Preferably, the second information comprises a request for data and the third information comprises a response with the data, to allow the first location to request the second location for more data.

An embodiment of the method is defined in claim 4. Preferably, the data is arranged to create timing data, the timing data defining one or more timing features such as for example a start and/or an end and/or a duration of a billing period of the roaming call, to allow the first location to detect roaming fraud in dependence of the one or more timing features of the billing period of the roaming call.

An embodiment of the method is defined in claim 5. The first information may comprise an application part initiation message, such as a Customized Applications for Mobile network Enhanced Logic (CAMEL) Application Part (CAP) Initial Detection Point (IDP) message. The second information may comprise an application part request message, such as a CAP Request Report Basic Call State Model (RRBCSM) (answer/disconnect) message. The second information may further comprise an application part connection message and/or an application part continuation message, such as a CAP CONNECT/CONTINUE message, and the third information may comprise an application part response message, such as a CAP Event Report Basic Call State Model (ERBCSM) (answer) message or a CAP ERBCSM (disconnect) message. Further messages such as busy messages are not to be excluded.

An embodiment of the method is defined in claim 6. According to a fourth step, at the first location, the third information is converted into one or more reports for said evaluating. For example in response to a CAP ERBCSM (answer) message, a first report may be generated, such as a first Call Detail Report (CDR). For example in response to a CAP ERBCSM (disconnect) message, a second report may be generated, such as a second Call Detail Report (CDR). An evaluation is done at the first location and may be done in an arrangement or in a fraud detection system coupled to the arrangement. According to a fifth step, at the first location, in response to an evaluation, fourth information is transmitted to the second location, for example to interrupt and finish the roaming call. In a minimum situation, one report (an end report) is generated. Preferably, in an extended situation, two reports (a start report and an end report) are generated. Further preferably, in a more extended situation, three or more reports (a start report plus one or more intermediate reports plus an end report) are generated. Alternatively and/or in addition, said evaluation and/or said one or more reports may be based on a timing procedure that for example provides an indication in case a threshold is exceeded.

An embodiment of the method is defined in claim 7. Preferably, the fourth information may comprise a command for the second location and/or the fourth information may comprise an application part release message, such as a CAP release message.

An embodiment of the method is defined in claim 8. Preferably, the fourth information may comprise a Called Party Number determined by the home network operator. This has the advantage that the home network operator may decide to for example reroute the call to a helpdesk, instead of releasing the call.

An embodiment of the method is defined in claim 9. According to a sixth step—at the first location (1), in response to a further evaluation, fifth information (74,76) is transmitted to the second location (2). (Part of) this further evaluation may for example take place in the unit 12, unit 11 or in the HLR. During the further evaluation various messages are exchanged within the first location, as described above in relation with the embodiments of the method as defined in claims 1 to 6. In the further evaluation it is determined which services are eligible for disablement or limitation and furthermore which services should be disabled or limited. The fifth information may for example comprise commands or instructions to change the settings within the second location in order to disable or limit the future usage of certains services by the affected roaming subscriber at the second location.

An embodiment of the method is defined in claim 10. Preferably, the fifth information may comprise a command for the second location, preferably a Mobile Application Part (MAP)_InsertSubscriberData command According to a second aspect of the invention, a computer program product as defined in claim 11 is provided.

According to a third aspect of the invention, a medium as defined in claim 12 is provided.

According to a fourth aspect of the invention, an arrangement as defined in claim 13 is provided. A transceiver may comprise one or more transmitters with one or more transmitting functions and one or more receivers with one or more receiving functions. Alternatively, a transceiver may comprise means for transmitting and may comprise means for receiving.

An embodiment of the arrangement is defined by further comprising a converter for converting the third information into one or more reports for said evaluating, the transceiver being arranged for, in response to an evaluation, transmitting fourth information to the further arrangement. A converter may comprise one or more converters or one or more generators with one or more converting functions. Alternatively, a converter may comprise means for converting.

According to further embodiments of the arrangement, the roaming call may be billed via a post-paid subscription, the first information may define at least a feature of the roaming call, and the second information may define the roaming call being allowed, the second information may comprise a request for data and the third information may comprise a response with the data, the data may be arranged to create timing data, the timing data may define one or more timing features such as for example a start and/or an end and/or a duration of a billing period of the roaming call, the first information may comprise an application part initiation message, the second information may comprise an application part connection message and/or an application part continuation message, the second information may further comprise an application part request message, the third information may comprise an application part response message, the fourth information may comprise a command for the second location and/or the fourth information may comprise an application part release message, as all discussed above.

An insight may be, that a roaming call should be reported to a first location by a second location (before the roaming call has been completely set up and/or before a billing period of the roaming call has been started). A basic idea may be, that the first location should request the second location for additional information and then evaluate this additional information (after the roaming call has been completely set up and/or after a billing period of the roaming call has been started).

A problem, to provide a method for monitoring a roaming call to detect roaming fraud in a relatively efficient way, is solved. A further advantage may be, that a relatively efficient on-the-fly roaming fraud detection procedure has been created, which may be used in parallel to existing constructions which may be held responsible for late reporting. Yet another advantage may be that further fraud, use or abuse of services by a roaming subscriber may be prevented or limited, thus providing benefit to the home network operator.

These and other aspects of the invention are apparent from and will be elucidated with reference to the embodiments described hereinafter.

Figure 1:
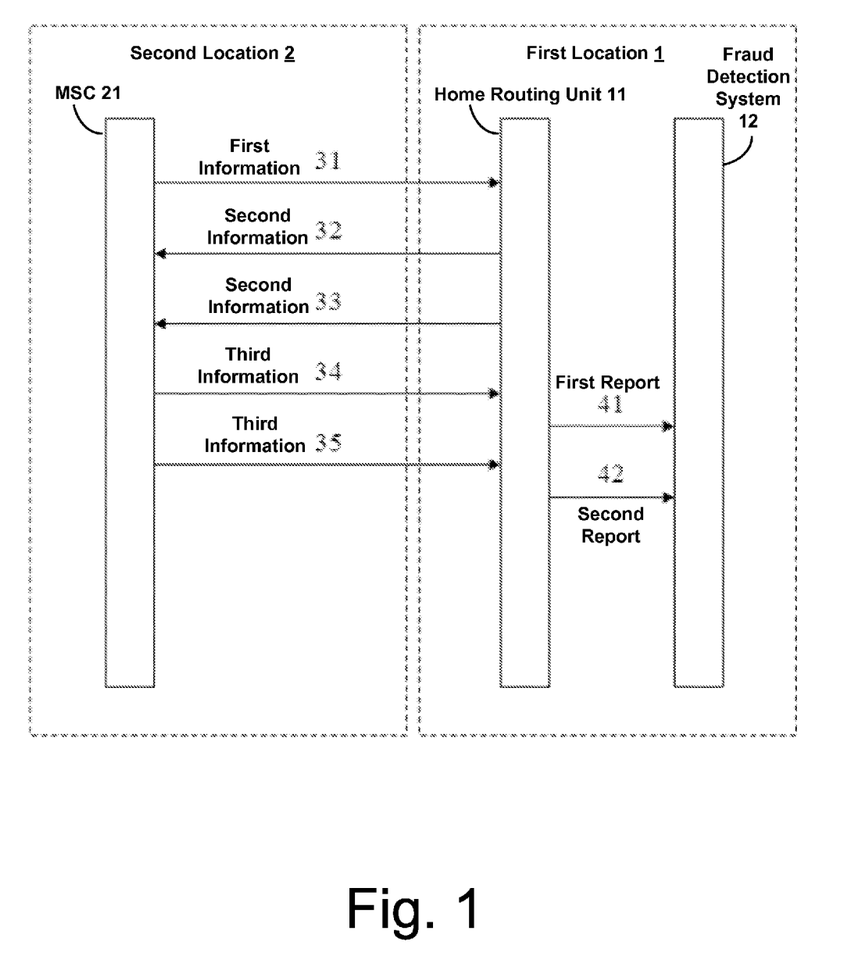
FIG. 1 shows a first schematic diagram of a first method according to the invention.

In the FIG. 1, in the first schematic diagram of the first method according to the invention (normal call clearing), a first location 1 is shown comprising a unit 11 such as a selective home routing unit, preferably a Service Control Point, or a selective home routing service and a unit 12 such as a fraud detection system or a fraud detection service. Further, a second location 2 is shown comprising a unit 21 such as a visited mobile switching unit (or center). First information 31 that for example defines at least one feature of a roaming call to be set up in the second location 2 and for example to be billed via a post-paid subscription is transmitted from the second location 2 to the first location 1, for reporting the roaming call to the first location 1. These one or more features of the roaming call are for example a calling party number and/or a calling party address. In response to a reception of the first information 31, second information 32,33 is transmitted to the second location 2. This second information 33 for example defines the roaming call to be allowed. The second information 32 for example comprises a request for data. In response to a reception of the second information 33, the second location 2 allows the roaming call to be set up or not. In response to a reception of the second information 32, the second location 2 transmits third information 34,35 to the first location 1. This third information 34,35 for example comprises a response with the data. This data may be arranged to create timing data, the timing data defining one or more timing features such as for example a start and/or an end and/or a duration of a billing period of the roaming call. In response to a reception of the third information 34,35, the first location 1 can evaluate the roaming call.

The first information 31 may comprise an application part initiation message, such as a Customized Applications for Mobile network Enhanced Logic (CAMEL) Application Part (CAP) Initial Detection Point (IDP) message. The second information 32 may comprise an application part request message, such as a CAP RRBCSM (answer/disconnect) message. The second information 33 may further comprise an application part connection message and/or an application part continuation message, such as a CAP CONNECT/CONTINUE message, and the third information 34,35 may comprise an application part response message, such as a CAP ERBCSM (answer) message or a CAP ERBCSM (disconnect) message. Further messages are not to be excluded.

For example in response to a reception of the third information 34, a first report 41, such as a first Call Detail Report (CDR), is generated at the unit 11 and sent to the unit 12. For example in response to a reception of the third information 35, a second report 42, such as a second Call Detail Report (CDR), is generated at the unit 11 and sent to the unit 12. A possible content of a first CDR is Calling Party Address defining the second location or a part thereof, Calling Party Number+Nature of address, Called Party Number+Nature of address, Date and time (e.g. GMT or Europe) from CAP_RRBCSM (Answer) operation, Type of Report: Answer. A possible content of a second CDR is Calling Party Address defining the second location or a part thereof, Calling Party Number+Nature of address, Called Party Number+Nature of address, Date and time (e.g. GMT or Europe) from CAP_RRBCSM (Disconnect) operation, Call Duration, Type of Report: Disconnect with information which leg (A/B) disconnected the call. Further reports are not to be excluded.

Figure 2:
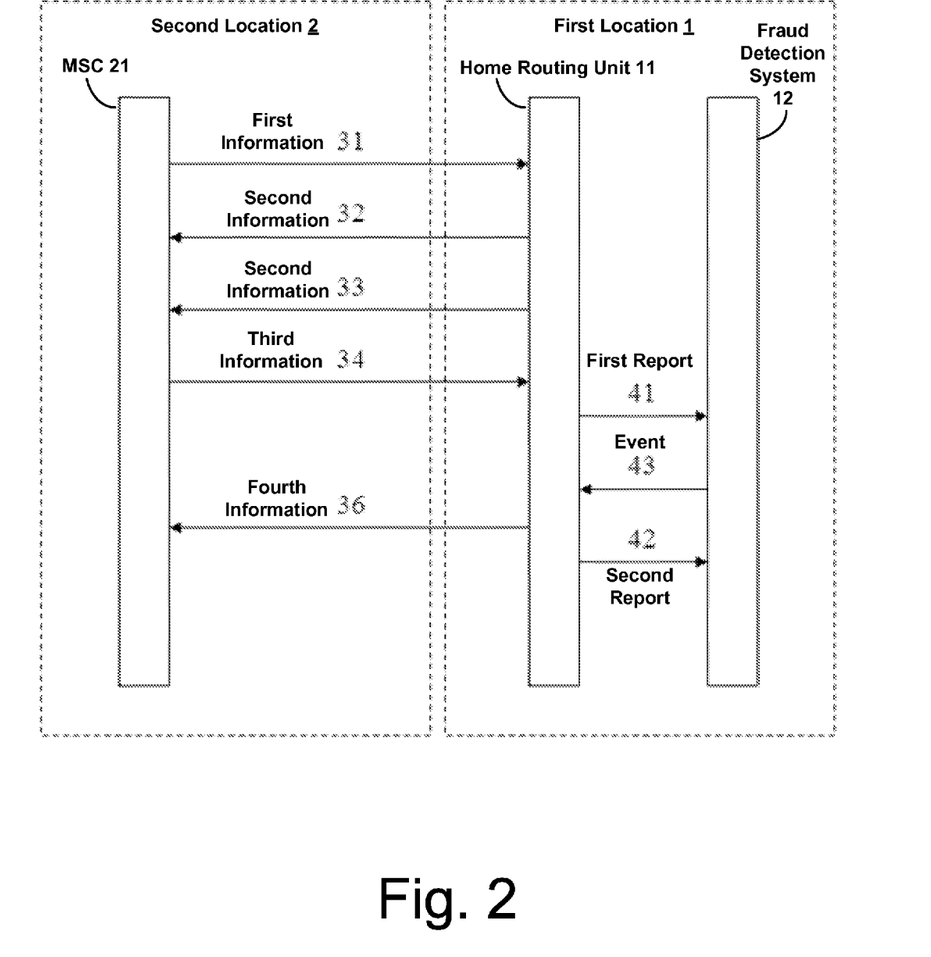
FIG. 2 shows a second schematic diagram of a second method according to the invention.

In the FIG. 2, the second schematic diagram of the second method according to the invention (forced call clearing) differs from the one shown in the FIG. 1 in that in the first location 1 the unit 12 in response to a reception of a first report 41, such as a first Call Detail Report (CDR), generates an event 43 to clear the roaming call and sends this event 43 to the unit 11. This event 43 is for example a result of an evaluation performed inside the unit 12 or in another unit not shown. In response to a reception of the event 43, the unit 11 in the first location 1 transmits fourth information 36 to the second location 2. This fourth information 36 may comprise a command for the second location 2, for example to interrupt and finish the roaming call, and/or may comprise an application part release message, such as a CAP release message. A possible content of a first CDR is Calling Party Address defining the second location or a part thereof, Calling Party Number+Nature of address, Called Party Number+Nature of address, Date and time (e.g. GMT or Europe) from CAP_RRBCSM (Answer) operation, Type of Report: Answer. A possible content of a second CDR is Calling Party Address defining the second location or a part thereof, Calling Party Number+Nature of address, Called Party Number+Nature of address, Date and time (e.g. GMT or Europe) from CAP_Release operation, Call Duration
Type of Report: CAP_Release. Further messages and/or further reports are not to be excluded.

In view of the FIG. 2, it should be noted that in case in the first location 1 for example a black list is kept, it is not to be excluded that the fourth information 36 is generated in response to a reception of the first information 31, with the second and third information 32-35 not being exchanged. In this case, the roaming call is not set up and is not monitored, except if the destination, e.g. Called Party Number, is kept in a white list. The white list may define one or more destinations such as one or more service hotlines.

In a further embodiment in view of the above, when for example a blacklist is kept, the fourth information generated in response to the first information, may contain a CAP CONNECT message and a Called Party Number inserted by the unit 11, the Called Part Number being different from the original Called Party Number contained in the first information. This has the effect that the call will be rerouted to a number of preference, determined by the operator of the home network. This may for instance be a helpdesk number. This has the advantage that in case the roaming subscriber has been put on a blacklist because of suspected fraud or abuse, a possible misjudgment by the fraud management system could be manually reversed by, or at the request of the helpdesk operator. Other applications of such rerouting are also possible.

Figure 3:
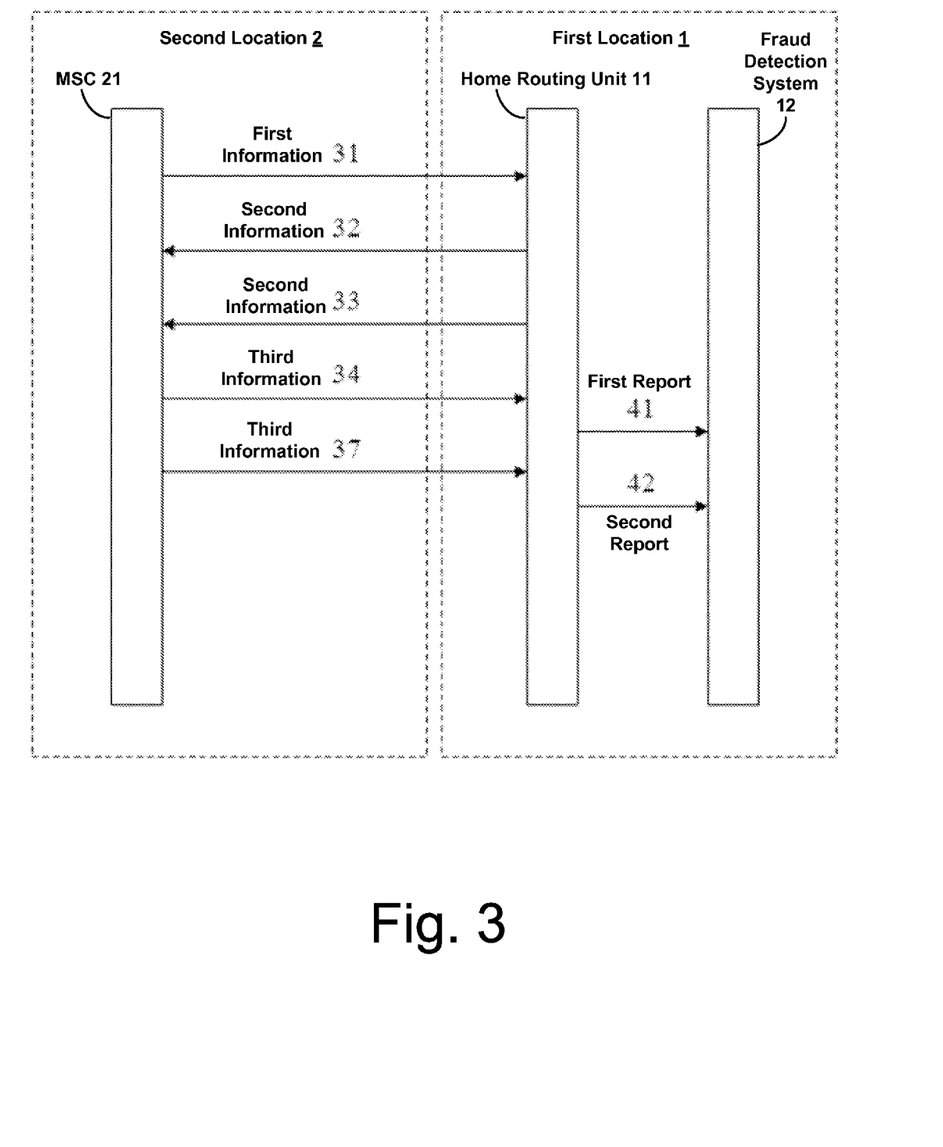
FIG. 3 shows a third schematic diagram of a third method according to the invention.

In the FIG. 3, the third schematic diagram of the third method according to the invention (abnormal call clearing in the second location) differs from the one shown in the FIG. 1 in that in the third information 34,37 generated in the second location 2 comprises an application part response message, such as a CAP ERBCSM (answer) message and comprises an application part abort message, such as a TCAP abort message. A possible content of a first CDR is Calling Party Address defining the second location or a part thereof, Calling Party Number+Nature of address, Called Party Number+Nature of address, Date and time (e.g. GMT or Europe) from TCAP_(Answer) operation, Type of Report: Answer. A possible content of a second CDR is Calling Party Address defining the second location or a part thereof, Calling Party Number+Nature of address, Called Party Number+Nature of address, Date and time (e.g. GMT or Europe) from TCAP_Abort operation, Call Duration, Type of Report: TCAP_Abort. Further messages and/or further reports are not to be excluded.

Figure 4:
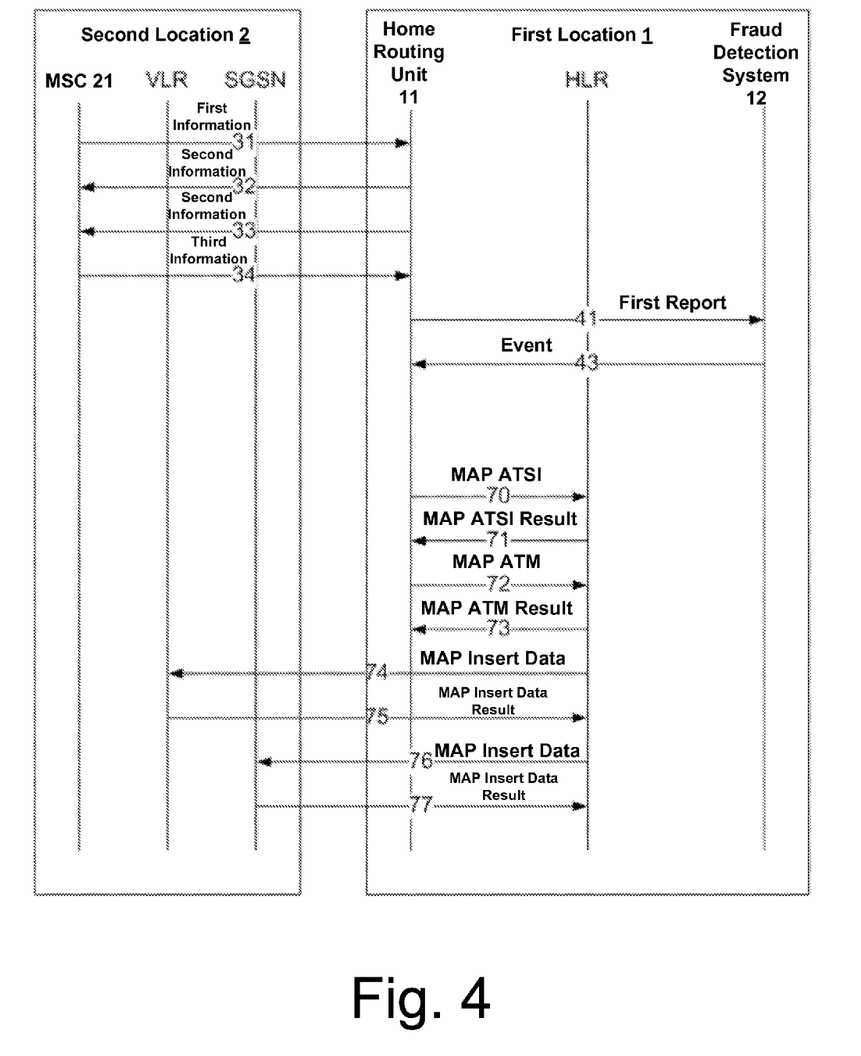
FIG. 4 shows a fourth schematic diagram of a fourth method according to the invention.

In the FIG. 4, the fourth schematic diagram of the fourth method according to the invention (other service disablement) is shown. The fourth method is in essence a further improvement of method 2 and can be used to not only monitor and if necessary clear roaming calls, but also to actively disable or limit the use of other services of the roaming subscriber, related to his subscription(s).

The fourth method initially performs the same information exchanges 31-34 and 41 as described in method 2 and shown in FIG. 2. However the operation whereby unit 11, preferably a Service Control Point, receives the event 43 from unit 12 to clear a call for a roaming subscriber, not only initiates the whole sequence of further steps according to method 2 (such as the transmitting of fourth information 36 or the report 42, both not repeated in FIG. 4), but also sets in motion a whole new set of steps designed to disable or limit the future usage of other services the roaming subscriber might have access to. This is accomplished by activating certain barrings on the Home Location Register (HLR) located in the home network and the Visitor Location Register (VLR) located in the visited network. The event 43 may comprise the instructions for the unit 11 how to limit or disable certain services, but another option is that these instructions are already preset on unit 11.

The additional steps are shown in FIG. 4 and further detailed below. First the configuration of the barring(s) for this subscriber has to be verified. The unit 11 sends a MAP Any Time Subscription Interrogation (ATSI) operation (70) to the HLR to request the barring(s). The following list contains examples of barrings which might be useful to prevent the usage of further service by the roaming subscriber. The list contains only a set of possible barrings. Additional barrings may be supported.

Barring of Outgoing Calls
    Barring of all outgoing calls
    Barring of all outgoing international calls
    Barring of all outgoing international calls except those to the home network
    Barring of all outgoing calls when roaming outside the home network
Barring of Incoming Calls
    Barring of all incoming calls
    Barring of all incoming calls when roaming outside the home network
Barring of Roaming
    Barring of roaming outside the home network
Barring of Premium Rate Calls
    Barring of outgoing premium rate (information) calls
    Barring of outgoing premium rate (entertainment) call
Barring of Packet Oriented Services
    Barring of all Packet Oriented services
    Barring of Packet Oriented services from home network access points whilst subscriber is in a visited network Barring of Packet Oriented services from access point in a roaming visited network The response of operation 70 is a MAP_ATSI result operation (71). This operation contains information about the barring(s) in the HLR (located in the home network). A MAP Any Time Modification (MAP ATM) request operation with the selected barring(s) is sent to the HLR. The MAP_ATM request operation (72) is answered by the HLR with a MAP_ATM result operation (73). The HLR forwards the barring(s) to the VLR (located in the visited network) with a MAP_InsertSubscriberData operation (74). This request is answered by the VLR with a MAP_InsertSubscriberData result operation (75).

Alternatively, if it is required to also disable or limit packet switched services, after the operations 70-73 are performed, the HLR also sends a MAP_InsertSubscriberData operation (76) to the Serving GPRS Support Node (SGSN), located in the second location. This request is answered by the SGSN with a MAP_InsertSubscriberData result operation (77).

Depending on the configured barring(s), further circuit and/or packet service usage attempts of the effected roaming subscriber will be prevented or limited by the unit 21 and or the SGSN in the second location. In case of a new location update procedure, for example caused by the switching off and on of the mobile device used by the roaming subscriber, the activated barring(s) on the HLR will be automatically inserted in the VLR/SGSN again. This way the disablement(s) and or limitation(s) caused by the activated barrings are permanent, and can only be reversed by the home network operator.

According to the above described embodiments, the first location 1 is for example a home location and the units 11 and 12 are for example home units and the second location 2 is for example a visited location and the unit 21 is for example a visited unit. However, alternatives are not to be excluded, such as a possibility that the first location 1 is for example a home location and the units 11 and 12 are for example home units and the second location 2 is for example a gateway location and the unit 21 is for example a gateway unit. So, the roaming call may be a mobile originating call or a mobile forwarded call or a mobile terminated call.

Figure 5:
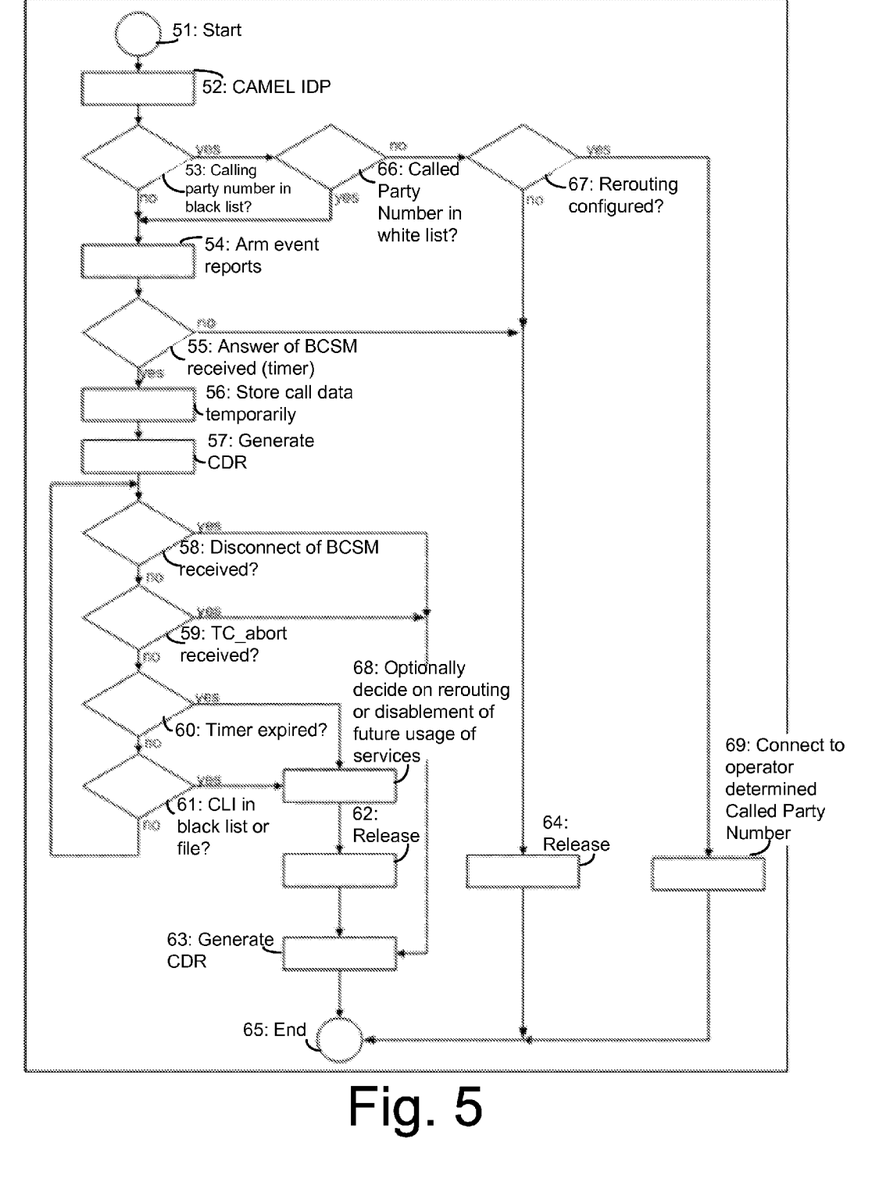
FIG. 5 shows a fifth schematic diagram of a fifth method according to the invention.

In the FIG. 5, in the fifth schematic diagram an exemplary call flow is shown, that could apply to the methods described in FIGS. 1-4. It is in no way intended as a limiting call flow, so other flows are possible. In this exemplary diagram, the following blocks have the following meaning:

51: Start.
52: CAMEL IDP.
53: Calling party number in black list? If yes goto 66, if no goto 54.
54: Arm event reports.
55: Answer of BCSM received (timer)? If yes goto 56, if no goto 64.
56: Store call data temporarily.
57: Generate CDR.
58: Disconnect of BCSM received? If yes goto 63, if no goto 59.
59: TC_abort received? If yes goto 63, if no goto 60.
60: Timer expired? If yes goto 62, if no goto 61.
61: CLI in black list or file? If yes goto 62, if no goto 58.
62: Release.
63: Generate CDR.
64: Release.
65: End.
66: Called Party Number in white list? If yes goto 54, if no goto 67.
67: Rerouting configured? If yes goto 69, if no goto 64.
68: Optionally decide on rerouting or disablement of future usage of services
69: Connect to operator determined Called Party Number In the FIG. 6, a schematic block diagram of an arrangement 13 according to the invention is shown located in the first location 1 and comprising a transceiver 14. The transceiver 14 is to be coupled to the second location 2 possibly via one or more switches, gateways, routers etc. and is coupled to a converter 15. The converter 15 is to be coupled to a home detector in the first location 1 for detecting roaming fraud. The transceiver 14 and the converter 15 are further coupled to a controller 16 that is further coupled to a database 17 such as a home location register. The arrangement 13 forms for example part of the unit 11 and the home detector forms for example part of the unit 12, without having excluded other solutions such as a full integration of the units 11 and 12 and such as a full integration of the arrangement 13 and the home detector.

Figure 6:
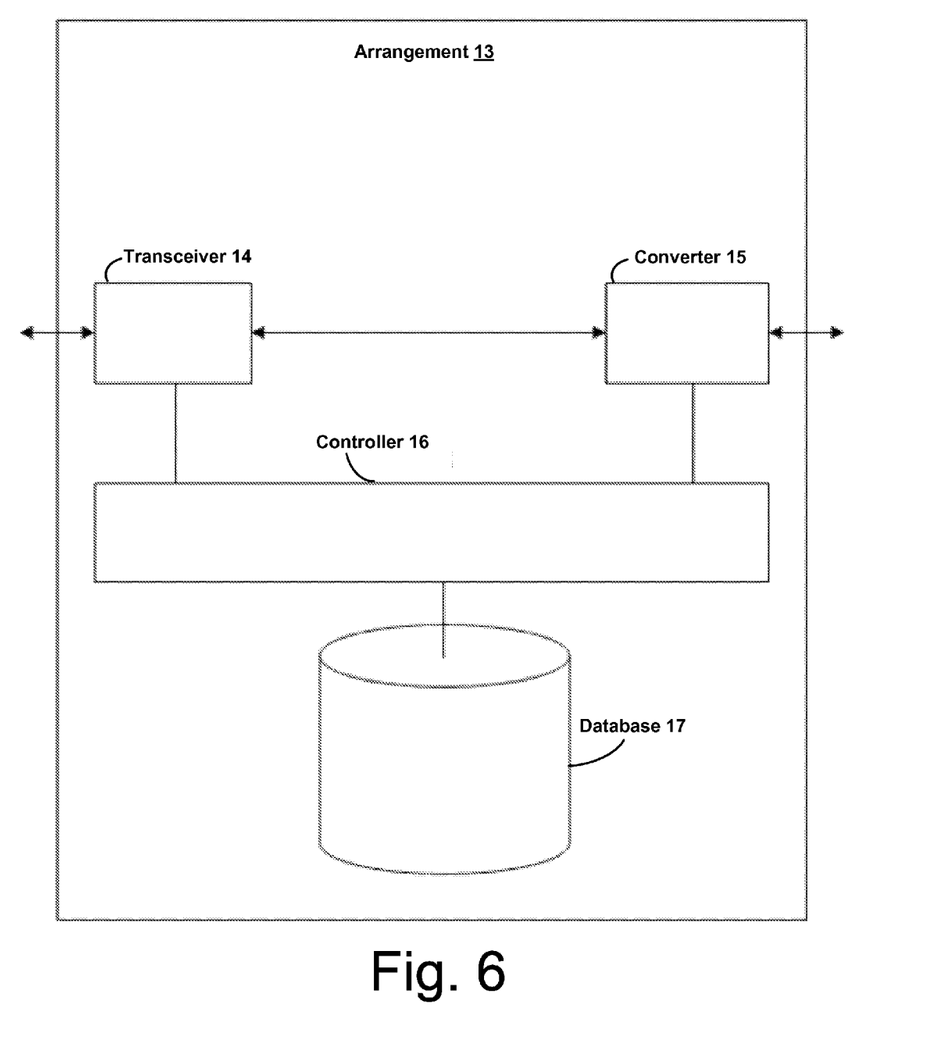
FIG. 6 shows a schematic block diagram of an arrangement according to the invention.

Inside the arrangement 13, the controller 16 for controlling the transceiver 14 and the converter 15 and the database 17 may alternatively be coupled to a bus or a switch, with the transceiver 14 and the converter 15 and the database 17 being coupled to each other via the bus or the switch etc. Further alternatives are not to be excluded.

So, the above defines technical requirements for a new service for fraud indication roaming for post-paid subscribers. This new service may be realized on any kind of platform. The new service may be based on a selective home routing service. The new requirement shall monitor the roaming calls of post-paid subscribers. To monitor the calls the service shall arm event reports of for example a basic call state model. Further it shall be possible to release a roaming call after a timer expired e.g. after a predefined number of minutes and/or to provide the dedicated Calling Party Number in a file located in a special directory or in a table (black list). The service shall generate an alarm for this event.

For an event of the Camel basic call state model a report may be generated. The report may contain subscriber and call information. Alternative existing reports of the platform, e.g. CDRs could be used if the requested parameters are covered by the CDRs. The reports (CDRs) may be located in a dedicated directory. The format of the reports (CDRs) and the file name may be specified arbitrarily. An exchange of the reports may be based on a file interface, e.g. SCP (SSH).

According to an option, a special table may provide a possibility to administrate calling party numbers (international format). For a Camel IDP operation the service logic may verify if the calling party number is configured within this table. In case of a match (best match) the service may release the call with a Camel Release operation.

The administration of this table may be possible by a file interface. It may further be possible to insert, extract and delete data of this table. The table may contain in addition to the calling party number also a column with the date (time stamp) of this entry. It may be possible to update the configuration of this table immediately or by a daily maintenance window e.g. cronjob. For maintenance reason it shall be possible to extract all data of this table into a file.

For the service Mobile Originating (MOC) and Mobile Forwarded Calls (MFC) and Mobile Terminated Calls (MTC) may be relevant.

Summarizing, to monitor roaming calls, at first locations 1, first information 31 defining features of the roaming calls is received from second locations 2 for reporting the roaming calls to the first locations 1. In response to the first information 31, second information 32,33 defining the roaming calls being allowed and comprising requests for data is transmitted to the second locations 2, and third information 34,35 comprising responses with the data is received from the second locations 2 for evaluating the roaming calls, to perform on-the-fly roaming fraud detection and avoid clearing house constructions. The roaming calls may be billed via post-paid subscriptions. The data is arranged to create timing data defining timing features of billing periods of roaming calls. At the first locations 1, the third information 34,35 may be converted into reports 41,42 for said evaluating, and in response to evaluations, fourth information 36 may be transmitted to the second locations 2.

While the invention has been illustrated and described in detail in the drawings and the description, these drawings and this description are considered to be illustrative disclosures or exemplary disclosures, but not restrictive disclosures. The invention is not limited to the described embodiments. Other variations to the disclosed embodiments can be understood and effected by a person skilled in the art. In the claims, the word "comprising" does not exclude other elements or steps, and the indefinite article "a" or "an" does not exclude a plurality. A single processor or other single unit may fulfill the functions of several items recited in the claims. The mere fact that certain features are recited in mutually different dependent claims does not indicate that a combination of these measured cannot be used to advantage. A computer program product may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be considered to limit the scope.

The invention claimed is:

1. A method for detecting fraud during a roaming call, the method comprising:
   at a first apparatus, receiving first information from a second apparatus for reporting the roaming call to be set up, the second apparatus being located at a second location separate from a location of the first apparatus;
   at the first apparatus, in response to a reception of the first information, transmitting second information to the second location, the second information defining the roaming call being allowed and comprising a request for data; and
   at the first apparatus, receiving third information from the second apparatus for further evaluating the allowed roaming call for fraud, the third information comprising a response with the data;
   at the first apparatus, converting the third information into one or more reports for evaluating the allowed roaming call;
   at the first apparatus, in response to an evaluation, transmitting fourth information to the second apparatus; and
   the fourth information comprising a command for instructing the second apparatus to disconnect the allowed roaming call.

2. The method as defined in claim 1, the data being arranged to create timing data, the timing data defining one or more timing features of a billing period of the allowed roaming call.

3. The method as defined in claim 1, the first information comprising a Customized Applications for Mobile network Enhanced Logic (CAMEL) Application Part (CAP) Initial Detection Point (IDP) message, the second information comprising a CAP Request Report Basic Call State Model (RRBCSM) (answer/disconnect) message or a CAP CONNECT/CONTINUE message, and the third information comprising a CAP Event Report Basic Call State Model (ERBCSM) (answer) message or a CAP ERBCSM (disconnect) message.

4. The method as defined in claim 1, the fourth information comprising a Called Party Number determined by a home network operator.

5. The method as defined in claim 1, further comprising:
   at the first apparatus, in response to an evaluation, transmitting fifth information to the second apparatus.

6. The method as defined in claim 5, the fifth information comprising a command for commanding the second apparatus to limit or disable the future usage of certain services.

7. An apparatus comprising a processor and a computer program product stored on a non-transitory medium, the processor being configured by the computer program product to:
   receiving first information from a second apparatus for reporting a roaming call to be set up, the second apparatus being located at a second location separate from a location of the apparatus;
   in response to a reception of the first information, transmitting second information to the second location, the second information defining the roaming call being allowed and comprising a request for data;
   receiving third information from the second apparatus for further evaluating the allowed roaming call for fraud, the third information comprising a response with the data;
   converting the third information into one or more reports for evaluating the allowed roaming call;
   in response to an evaluation, transmitting fourth information to the second apparatus; and
   the fourth information comprising a command for instructing the second apparatus to disconnect the allowed roaming call.

8. The apparatus as defined in claim 7, the processor being further configured by the computer program product to:
   in response to an evaluation, transmit fifth information to the second apparatus, the fifth information comprising a command for commanding the second apparatus to limit or disable the future usage of certain services.

9. A non-transitory computer-readable storage medium for storing instructions thereon that, if executed by a computer device, cause the computing device to perform operations comprising:
   receiving first information from a second apparatus for reporting a roaming call to be set up;
   in response to a reception of the first information, transmitting second information to the second apparatus, the second information defining the roaming call being allowed and comprising a request for data;
   receiving third information from the second apparatus for further evaluating the allowed roaming call for fraud, the third information comprising a response with the data;
   converting the third information into one or more reports for evaluating the allowed roaming call;
   in response to an evaluation, transmitting fourth information to the second apparatus; and
   the fourth information comprising a command for instructing the second apparatus to disconnect the allowed roaming call.

10. The non-transitory computer-readable storage medium of claim 9, further comprising instructions thereon that, if executed by a computer device, cause the computing device to perform operations comprising:
   in response to an evaluation, transmit fifth information to the second apparatus, the fifth information comprising a command for commanding the second apparatus to limit or disable the future usage of certain services.

11. An apparatus for detecting fraud during a roaming call, the apparatus comprising a transceiver configured to:
- receive first information from a further apparatus for reporting the roaming call to be set up to an arrangement, the further apparatus being separate from the apparatus;
- in response to a reception of the first information, transmit second information to the further apparatus, the second information defining the roaming call being allowed and comprising a request for data;
- receive third information from the further apparatus for further evaluating the allowed roaming call for fraud, the third information comprising a response with the data;
- convert the third information into one or more reports for evaluating the allowed roaming call;
- in response to an evaluation, transmit fourth information to the further apparatus; and
- the fourth information comprising a command to instruct the further apparatus to disconnect the allowed roaming call.

12. The apparatus as defined in claim 11, wherein the transceiver is further configured to, in response to an evaluation, transmit fifth information to the further apparatus, the fifth information comprising a command for commanding the further apparatus to limit or disable the future usage of certain services.

* * * * *